Nov. 29, 1938.  O. LARSEN  2,138,607
HEAT TRANSFER APPARATUS
Filed Oct. 2, 1937
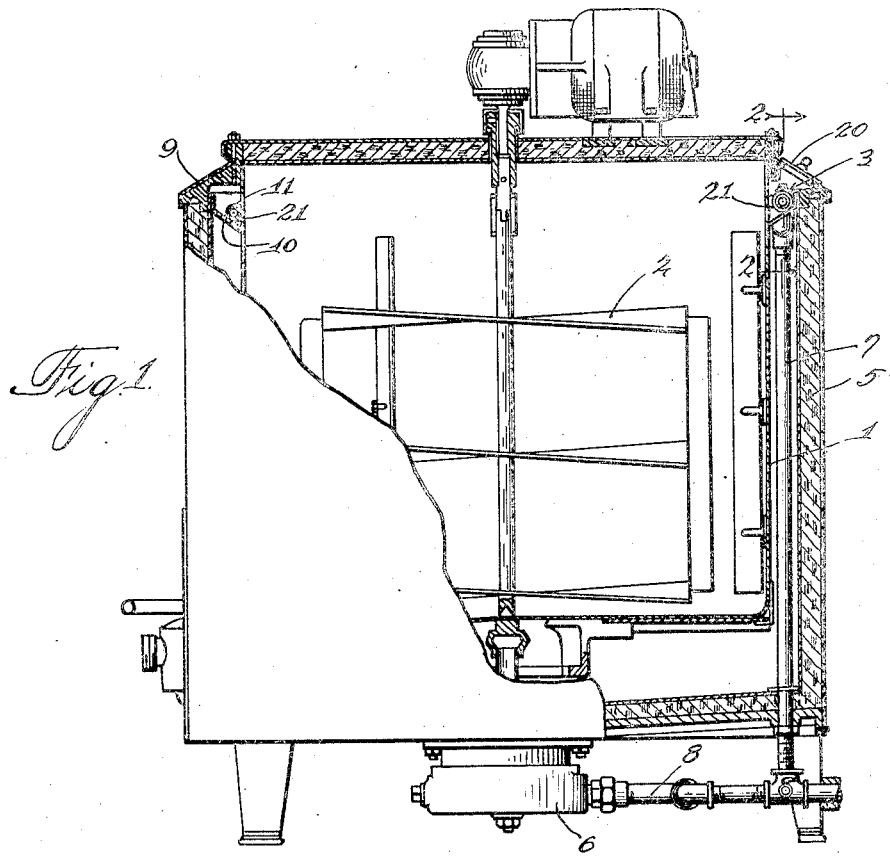
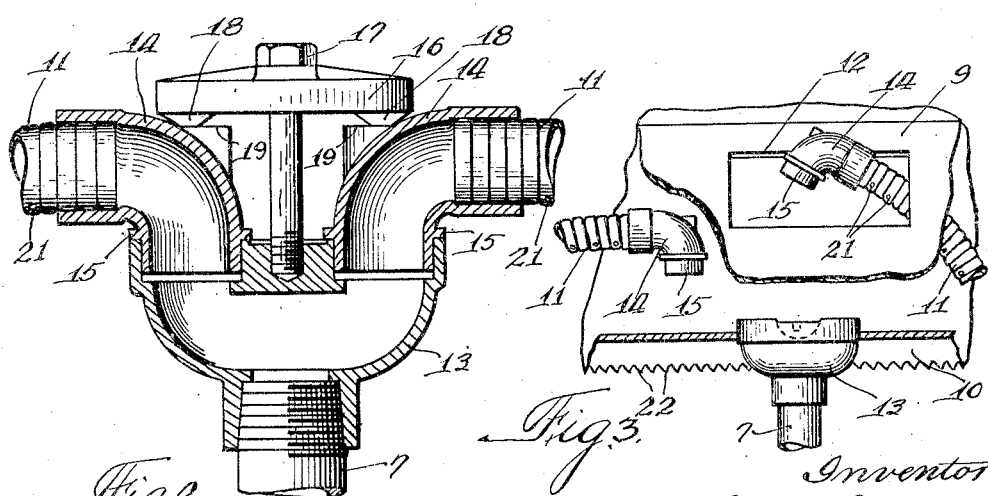
Inventor:
Olaf Larsen Patented Nov. 29, 1938

2,138,607

UNITED STATES PATENT OFFICE 2,138,607

HEAT TRANSFER APPARATUS

Olaf Larsen, Oak Park, Ill., assignor to The Creamery Package Mfg. Company, Chicago, Ill., a corporation of Illinois Application October 2, 1937, Serial No. 166,965

3 Claims. (Cl. 257—189)

My invention relates to heat transfer apparatus. More specifically, it relates to heat transfer apparatus comprising a tank for containing a liquid with respect to which heat is to be transferred, and means for causing a film of heat transferring liquid to flow downwardly over the outer surface of the side walls of the tank.

One of the objects of my invention is to provide improved heat transfer apparatus of the type indicated above, in which a flexible distributing conduit is provided for supplying the heat transferring liquid to the side walls of the tank and in which this flexible conduit may be readily disconnected and withdrawn.

Further objects and advantages of the invention will be apparent from the specification and claims.

In the drawing, in which an embodiment of my invention is shown,—

Figure 1 is an elevational view of an improved heat transfer apparatus, parts being broken away;

Fig. 2 is an enlarged, sectional, detail view substantially on the line 2—2 of Fig. 1; and Fig. 3 is a detail elevational view showing the manner of withdrawing the flexible conduit.

Referring to the drawing, the construction shown comprises a tank 1 for containing a liquid with respect to which heat is to be transferred, means 2 for stirring and agitating the liquid in the tank to cause all parts of the liquid to come in contact with the heat transfer surfaces, means 3 for causing a film of heat transferring liquid to flow downwardly over the outer surfaces of the side walls of the tank, a heat insulating housing 5 surrounding the tank 1 and spaced therefrom to provide space for the liquid film flow, a drainage receptacle 6 underneath the housing for receiving the liquid which flows over the tank surfaces, a conduit 7 extending through the bottom wall of the housing upwardly in the space between the side wall of the tank and housing for supplying liquid for the downward flow film, and a conduit 8 for supplying liquid for the lower tank surface.

The tank may be of any suitable material which will conduit heat readily and which will not rust, such as stainless steel. The upper edge of this tank may be supported on an annular conical breast member 9, the lower edge of which breast member rests on the upper edge of the cylindrical portion of the housing 5. For supporting the flexible distributing conduit and directing the flow therefrom against the outer surface of the side walls of the tank, an annular sheet metal member 10 is provided which may be secured to the conical breast member. The breast member 9, tank 1, and an annular member 10 thus provide an annular chamber surrounding the tank in which the distributing conduit 11 which surrounds the tank 1 is located. In order to provide for the ready removal of this conduit 11 from the annular chamber for cleaning, repair, or replacement, an opening 12 (Fig. 3) is provided in the breast member 9, and the two ends of the flexible conduit are detachably connected with a two-ported distributor head 13 screwed onto the upper end of the supply conduit 7. For this purpose, the ends of the flexible distributing conduit are provided with L-shaped tubular fittings or pipe elbows 14, the ends of which fit snugly into openings provided in the distributor head. The distance to which these elbows 14 can be inserted is limited by means of annular flanges 15 on the elbows which engage shoulders on the distributor head 13. For holding the elbows in position on the distributor head, a clamping head 16 and clamping screw 17 are provided, the clamping screw extending through the clamping head and being threaded into the distributor head 13. The clamping head 16 is provided with bosses 18 which engage shoulders 19 on the elbow fittings 14.

To remove the flexible distributor conduit 11, the clamping screw 17 and clamping head 16 are removed, the elbows 14 are separated from the distributor head 13 and one end of the distributor conduit is lifted up through the opening in the annular breast, as shown in Fig. 3, after which the conduit may be withdrawn through this opening, the conduit sliding in the annular chamber as it is being withdrawn. A suitable closure 20 (Fig. 1) may be provided for the opening 12. The distributor conduit 11 may be provided with suitably placed openings 21 for delivering jets of liquid into the annular channel surrounding the tank, the downwardly and inwardly sloping surface of the member 10 insuring the delivery of the liquid to the side walls of the tank. The lower edge of the member 10 may be notched as shown at 22 to insure the escape of the liquid from the annular chamber.

Further modifications will be apparent to those skilled in the art and it is desired, therefore, that the invention be limited only by the prior art and the scope of the appended claims.

Having thus described my invention, what I claim and desire to secure by Letters Patent is:

1. A heat transfer apparatus comprising a tank for containing a liquid with respect to which heat is to be transferred, means for causing a film of heat transferring liquid to flow downwardly over the outer surface of the walls of said tank, a housing surrounding said tank and spaced therefrom to provide space for said liquid film flow, an annular chamber surrounding said tank adjacent its upper edge, said film flow causing means comprising a two-ended annular flexible conduit lying in said annular chamber having openings through which liquid is supplied to the sides of the tank, and a supply conduit for supplying liquid to both ends of said two-ended conduit, the two ends of said conduit being detachably connected with said supply conduit, said chamber having an opening to which access may be had to the two ends of the flexible conduit whereby the two ends of the conduit may be readily connected and disconnected with respect to the supply conduit and whereby the flexible conduit may be readily withdrawn and inserted through said opening in said annular chamber.

2. A heat transfer apparatus comprising a tank for containing a liquid with respect to which heat is to be transferred, means for causing a film of heat transferring liquid to flow downwardly over the outer surface of the walls of said tank, a housing surrounding said tank and spaced therefrom to provide space for said liquid film flow, an annular chamber surrounding said tank adjacent its upper edge, said film flow causing means comprising a two-ended annular flexible conduit lying in said annular chamber having openings through which liquid is supplied to the sides of the tank, and a supply conduit for supplying liquid to both ends of said two-ended conduit, the two ends of said conduit being detachably connected with said supply conduit, said chamber having an opening to which access may be had to the two ends of the flexible conduit whereby the two ends of the conduit may be readily connected and disconnected with respect to the supply conduit and whereby the flexible conduit may be readily withdrawn and inserted through said opening in said annular chamber, said supply conduit extending upwardly in the space between said tank and housing and being provided with two upwardly-extending tubular connection members, one for each end of said flexible conduit, each end of said flexible conduit being provided with a downwardly-extending connection member for detachable connection with one of said upwardly-extending connection members.

3. A heat transfer apparatus comprising a tank for containing a liquid with respect to which heat is to be transferred, means for causing a film of heat transferring liquid to flow downwardly over the outer surface of the walls of said tank, a housing surrounding said tank and spaced therefrom to provide space for said liquid film flow, an annular chamber surrounding said tank adjacent its upper edge, said film flow causing means comprising a two-ended annular flexible conduit lying in said annular chamber having openings through which liquid is supplied to the sides of the tank, and a supply conduit for supplying liquid to both ends of said two-ended conduit, the two ends of said conduit being detachably connected with said supply conduit, said chamber having an opening to which access may be had to the two ends of the flexible conduit whereby the two ends of the conduit may be readily connected and disconnected with respect to the supply conduit and whereby the flexible conduit may be readily withdrawn and inserted through said opening in said annular chamber, said supply conduit extending upwardly in the space between said tank and housing and being provided with two upwardly-extending tubular connection members, one for each end of said flexible conduit, each end of said flexible conduit being provided with a downwardly-extending connection member for detachable connection with one of said upwardly-extending connection members, and clamping means for holding said connection members in connected position.

OLAF LARSEN.